(12) United States Patent (10) Patent No.: US 12,597,793 B2

Hanks (45) Date of Patent: Apr. 7, 2026

(54) SYSTEM AND METHOD FOR PROLONGING THE LIFE OF A BATTERY THAT IS ELECTRICALLY COUPLED TO A LOAD

(71) Applicant: Clayton Hanks, Pittsburg, IL (US)

(72) Inventor: Clayton Hanks, Pittsburg, IL (US)

( * ) Notice: Subject to any disclaimer, the term of this patent is extended or adjusted under 35 U.S.C. 154(b) by 881 days.

(21) Appl. No.: 17/941,876

(22) Filed: Sep. 9, 2022

(65) Prior Publication Data

US 2023/0078052 A1 Mar. 16, 2023

Related U.S. Application Data

(60) Provisional application No. 63/243,406, filed on Sep. 13, 2021.

(51) Int. Cl.
  *H02J 7/00* (2026.01)
  *H02J 7/34* (2006.01)

(52) U.S. Cl.
  CPC ........ *H02J 7/00712* (2020.01); *H02J 7/0013* (2013.01); *H02J 7/0047* (2013.01); *H02J 7/345* (2013.01); *H02J 2207/20* (2020.01)

(58) Field of Classification Search
  CPC .................................................. H02J 7/00712
  USPC .......................................................... 320/155
  See application file for complete search history.

(56) References Cited

U.S. PATENT DOCUMENTS

| | | | |
|---|---|---|---|
| 6,323,623 B1 | 11/2001 | Someya et al. | |
| 7,382,635 B2 | 6/2008 | Noda | |

| | | | |
|---|---|---|---|
| 9,415,732 B2 | 8/2016 | Kakiuchi et al. | |
| 10,833,523 B2 | 11/2020 | Hikosaka | |
| 2007/0132313 A1 | 6/2007 | Baeuerle | |
| 2014/0062200 A1* | 3/2014 | Stupka | H02J 7/345 |
| | | | 307/64 |
| 2016/0233556 A1* | 8/2016 | Nakamura | H02J 50/12 |
| 2022/0155384 A1* | 5/2022 | Lovati | G01R 27/2605 |
| 2022/0286055 A1* | 9/2022 | Baranwal | H02J 7/06 |

FOREIGN PATENT DOCUMENTS

| | | |
|---|---|---|
| CN | 201532995 U | 7/2010 |
| JP | 4079403 B2 | 2/2008 |
| JP | 2008312293 A | 12/2008 |
| JP | 5659649 B2 | 12/2014 |
| KR | 20070118347 A | 12/2007 |
| KR | 20190048972 A | 5/2019 |

* cited by examiner

*Primary Examiner* — Yalkew Fantu

(74) *Attorney, Agent, or Firm* — Martin IP Law Group; C. Richard Martin

(57) ABSTRACT

A system and method for prolonging a life of a battery is provided. The system may include a charge storage device and a battery. The charge storage device may be connected to the battery. The system may further include a controller connected to the charge storage device. The controller may compute a resonance frequency. The controller may further control the charge storage device to supply, to the battery, a specific voltage at a specific time defined by the resonance frequency, while the battery is under a load. Furthermore, the controller may control the charge storage device to charge while the battery is discharging and discharge while the battery is charging, for prolonging the life of the battery.

17 Claims, 9 Drawing Sheets

SYSTEM AND METHOD FOR PROLONGING THE LIFE OF A BATTERY THAT IS ELECTRICALLY COUPLED TO A LOAD

TECHNOLOGICAL FIELD

The present disclosure generally relates to batteries and more particularly relates to a system and method for prolonging life of the batteries.

BACKGROUND

Batteries are electrochemical devices that store chemical energy and convert the chemical energy into electrical energy to deliver a required power. These batteries are used in wide variety of applications. For example, the batteries are used in portable devices, inverters, motor vehicles, etc. Usually, these batteries drain the stored energy in order to deliver the required power. Even though various rechargeable batteries are currently available, which can be recharged once the stored energy is drained, one of the key concerns associated with the batteries is their battery life. For instance, the battery life of a battery may be a time taken by the battery to completely discharge when connected to a load.

Currently, there are various techniques available to prolong the battery life. For instance, these available techniques aim to prolong the battery life by moving to a battery saving mode, when the load demands for a less power (or the load is in inactive state). However, these available techniques fail to prolong the battery life when the load continuously demands for a power (or the load is in active state).

BRIEF SUMMARY

In order to solve the foregoing problem, the present disclosure provides a system for prolonging the life of the battery while the battery is supplying power to the load. The system may include a charge storage device and the battery. The charge storage device may be connected to the battery such that the battery and the charge storage device formulate a modified tank circuit. Some embodiments are based on the realization that when the battery of the modified tank circuit is supplied with a specific voltage at a specific time, an internal resonance within the battery and the charge storage device may occur. As a result, a chemical reaction within the battery may occur, due to which free electrons may be released. These released free electrons may lead to an additional power. Thereby, the additional power may be extracted from the battery. This additional power extracted from the battery may be used to charge the charge storage device. Once the charge storage device is charged, the charge storage device may be configured to recharge the battery. Accordingly, the life of the battery may be increased (or prolonged) beyond the conventional life of the battery.

In an example embodiment, the charge storage device may supply, to the battery, the specific voltage. In order to supply the specific voltage at the specific time, the system may further include a controller connected to the charge storage device. The controller may be configured to compute a resonance frequency. Based on the resonance frequency, the controller may be configured to control the charge storage device to supply the specific voltage. In an example embodiment, the controller may include a timing circuit. The timing circuit may generate, based on the resonance frequency, control signal(s) to control the charge storage device. Further, the controller may control the charge storage device to: (i) charge while the battery is discharging and (ii) discharge while the battery is charging.

According to some embodiments, the controller may control the charge storage device to supply the specific voltage to the battery at the specific time defined by the resonance frequency, while the battery is under the load. In these embodiments, the system may prolong the life of the battery while the battery is under the load. Additionally, when the load demands for more power than an operating power of the battery, the system may be configured to use the additional power extracted from the battery to provide the power to the load. Accordingly, the disclosed system may be used to prolong the life of the battery and/or provide more power to the load as per the requirements.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Figure 1:
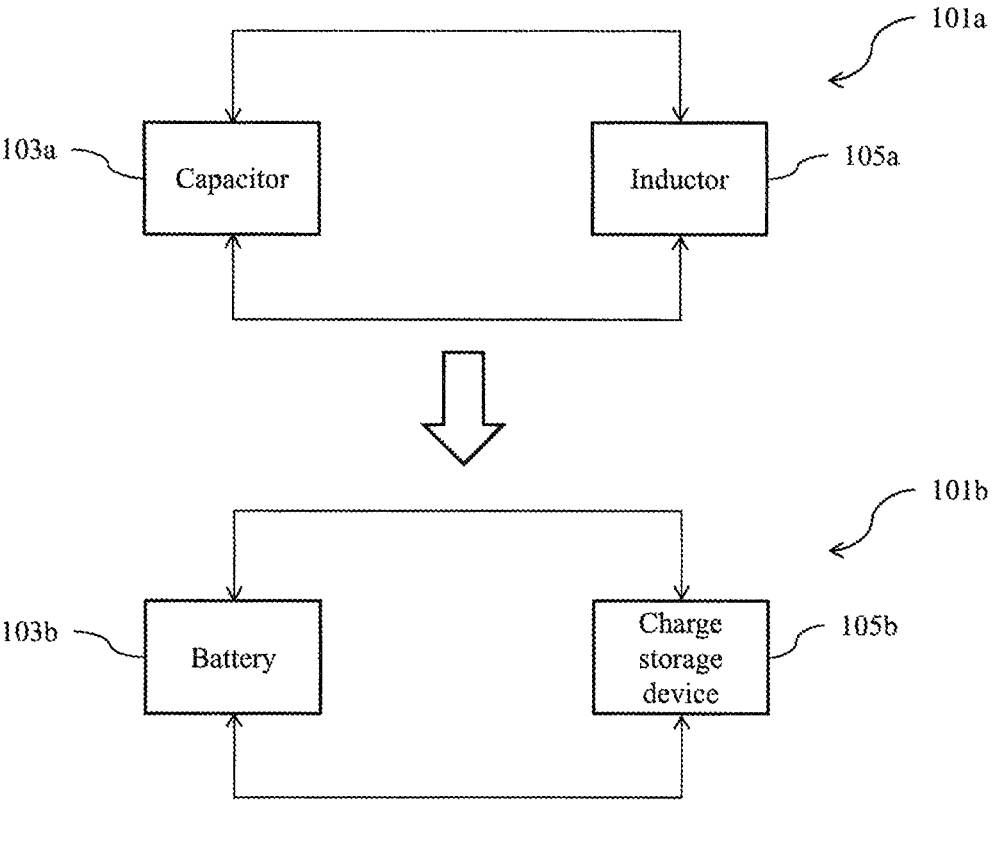
Figure 2A:
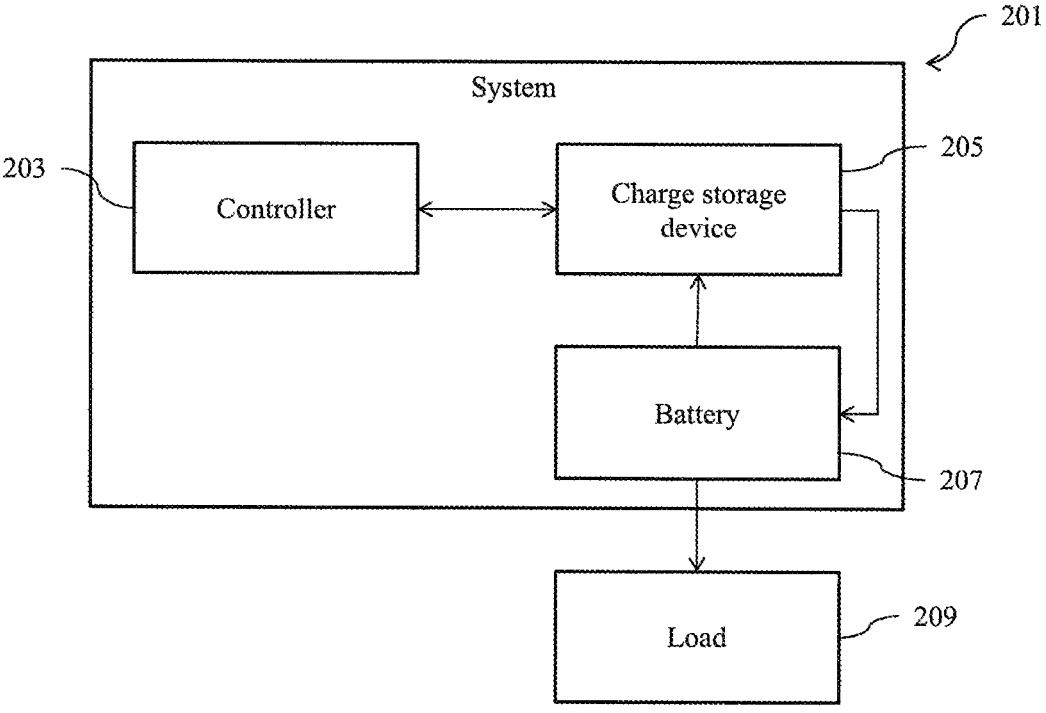
Figure 2B:
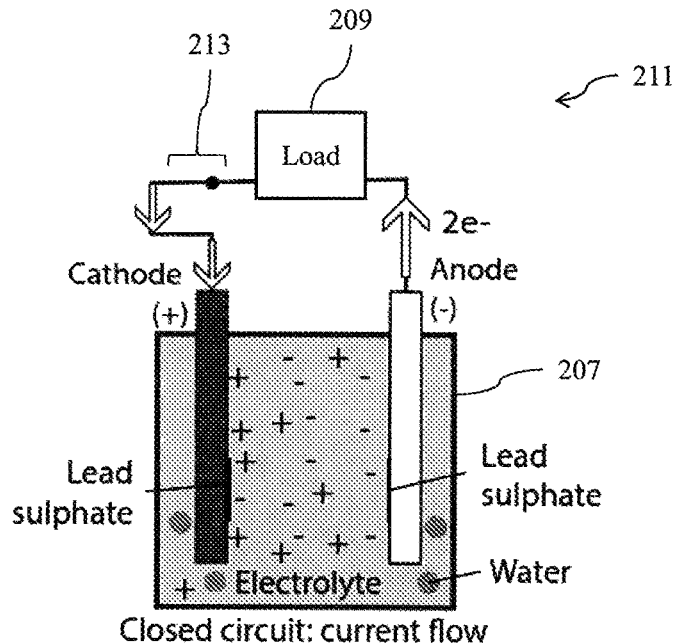
Figure 3A:
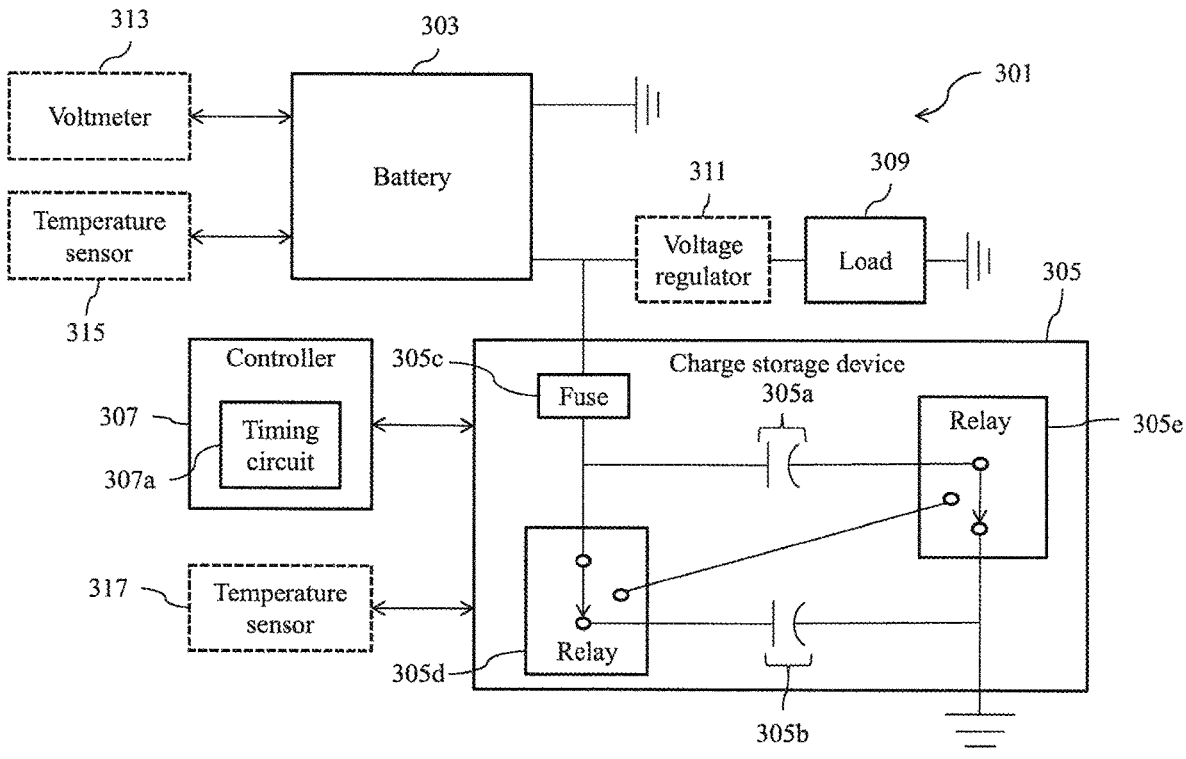
Figure 3B:
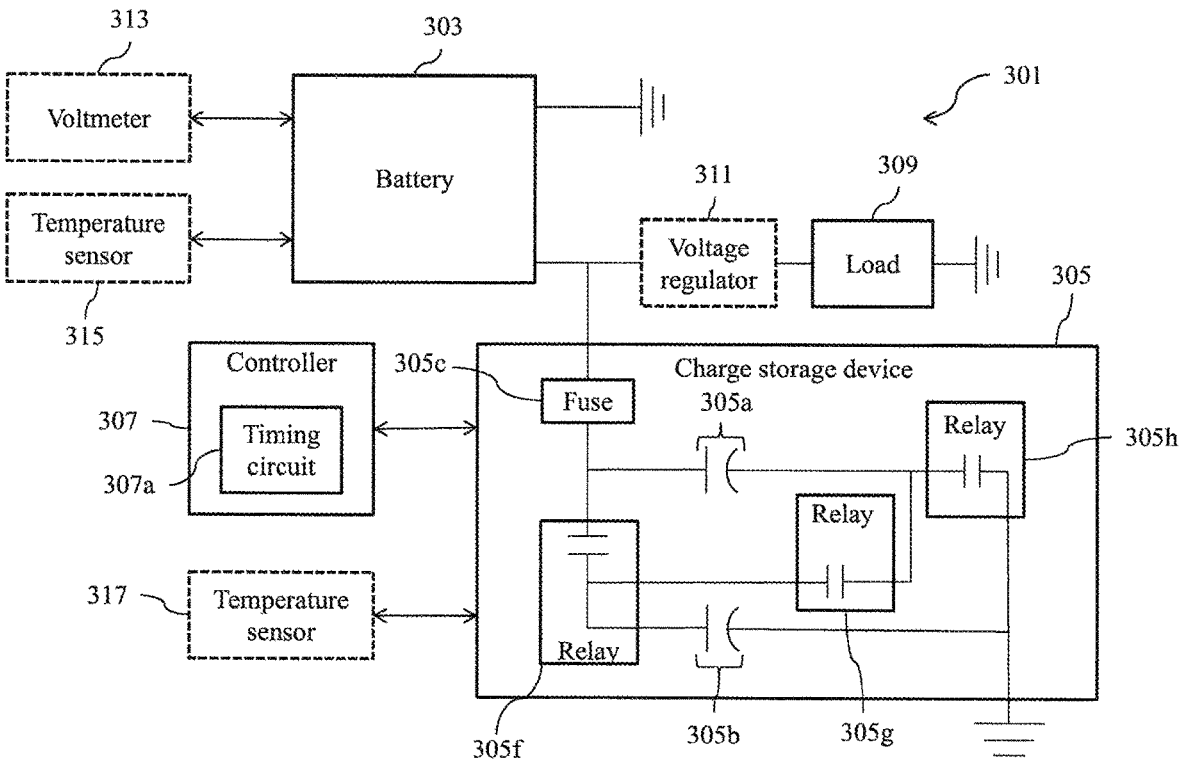
Figure 4A:
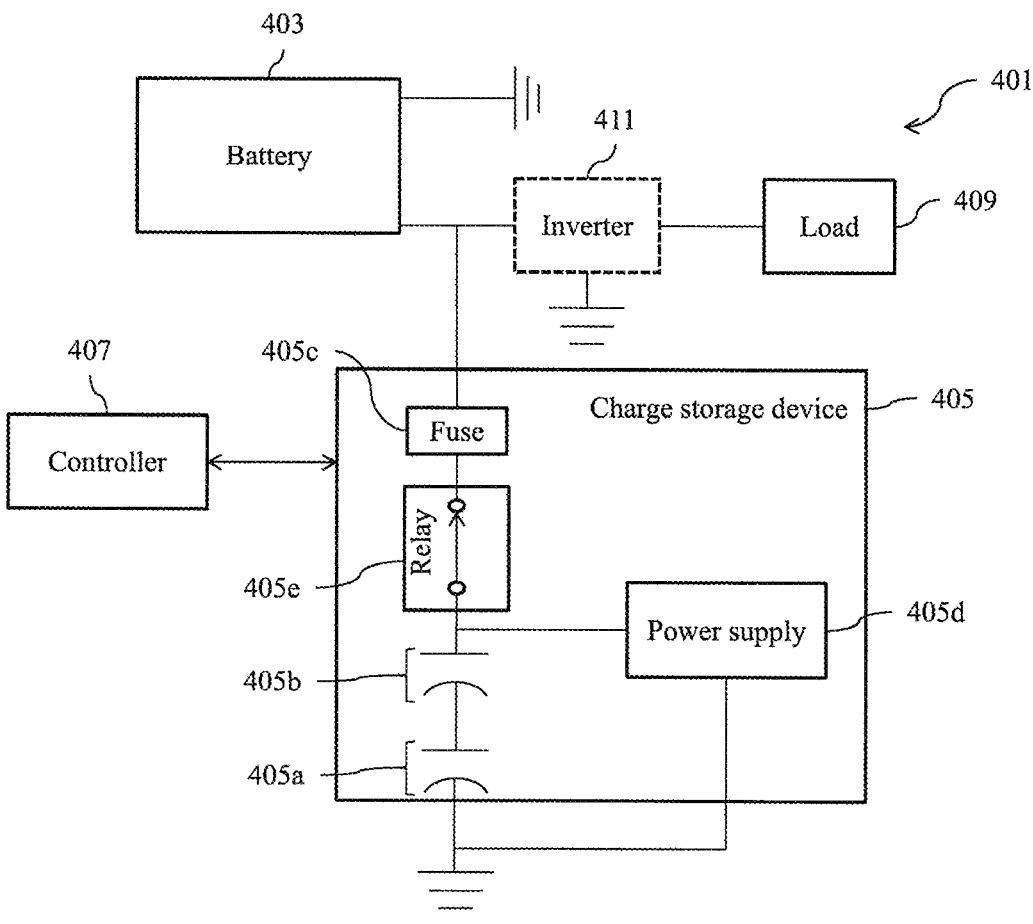
Figure 4B:
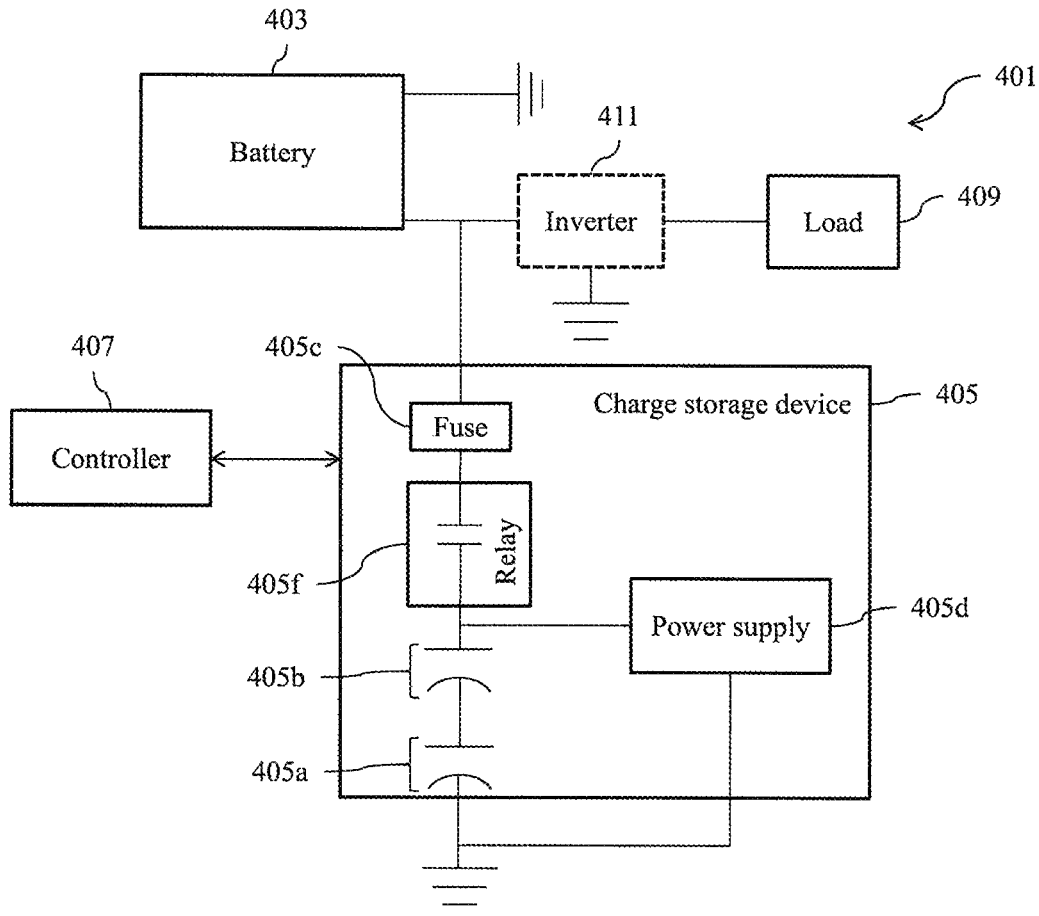
Figure 5:
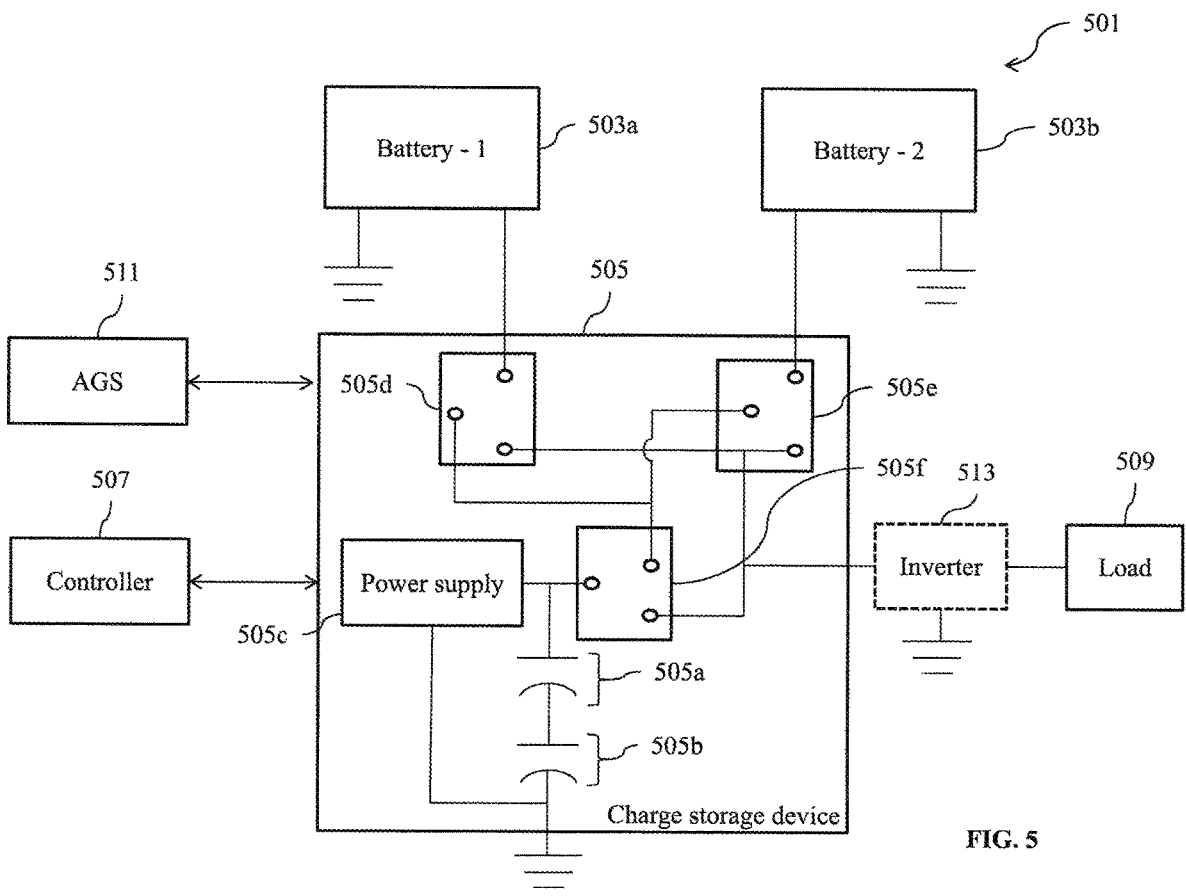
Figure 6:
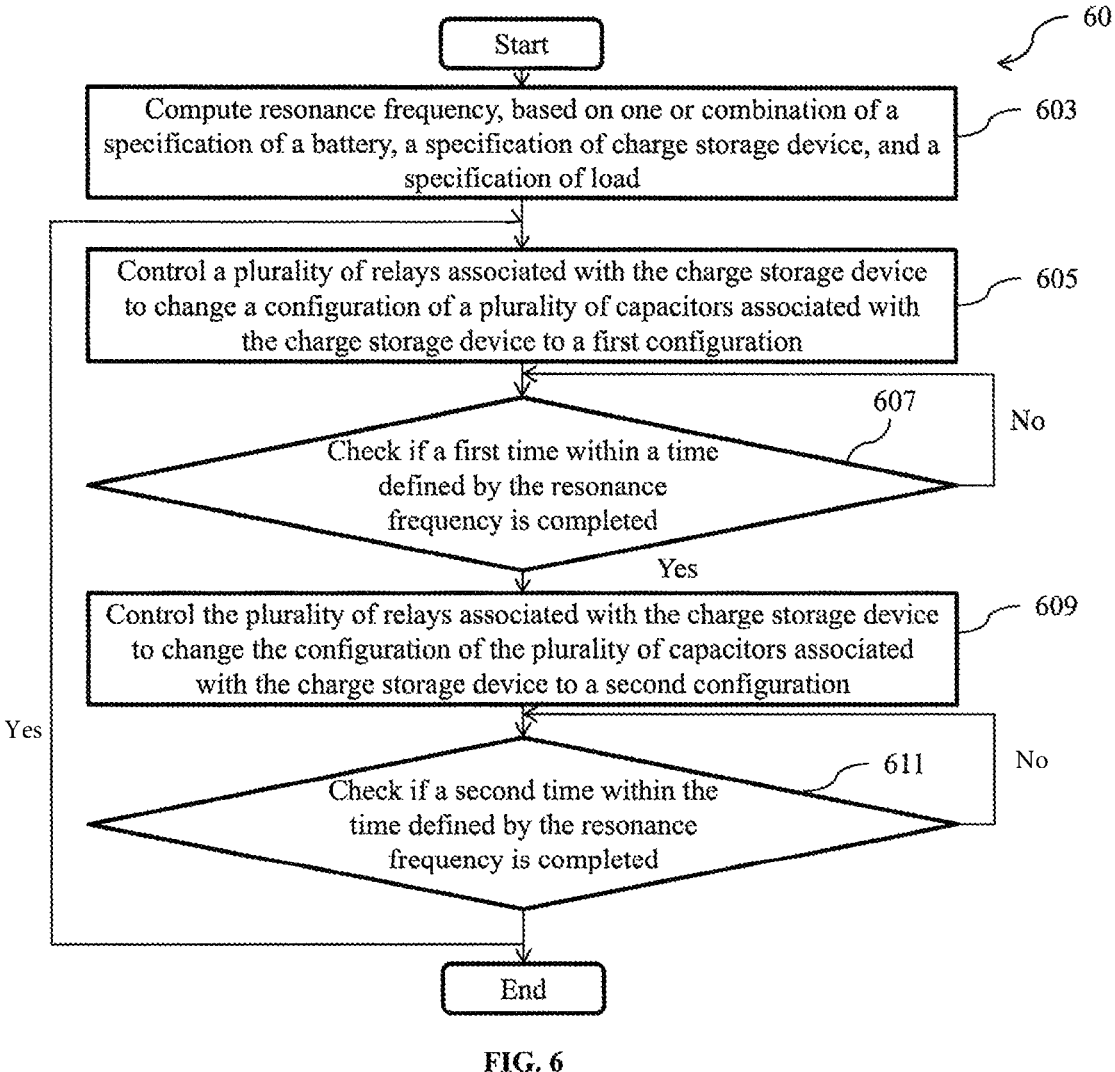

Having thus described example embodiments of the present disclosure in general terms, reference will now be made to the accompanying drawings, which are not necessarily drawn to scale, and wherein:

FIG. 1 illustrates a block diagram of a tank circuit, according to some embodiments of the present disclosure;

FIG. 2A illustrates a block diagram of a system for prolonging the life of a battery, according to some embodiments of the present disclosure;

FIG. 2B illustrates an overview of a discharge process of the battery, according to some embodiments of the present disclosure;

FIG. 3A illustrates a first configuration of the system for prolonging the life of the battery, according to some embodiments of the present disclosure;

FIG. 3B illustrates the first configuration of the system with solid state relays, according to some other embodiments of the present disclosure;

FIG. 4A illustrates a second configuration of the system for prolonging the life of the battery, according to some embodiments of the present disclosure;

FIG. 4B illustrates the second configuration of the system with a solid-state relay, according to some other embodiments of the present disclosure;

FIG. 5 illustrates a third configuration of the system for prolonging the life of an active battery, according to some embodiments of the present disclosure; and FIG. 6 illustrates a flowchart of a method for prolonging the life of an active battery, according to some embodiments of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the present disclosure are shown. Indeed, various embodiments of the present disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus (or a system) to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

FIG. 1 illustrates a block diagram of a tank circuit, showing an overview of principles of the tank circuit, according to some embodiments of the present disclosure. As illustrated in FIG. 1, a tank circuit 101a may include at least one capacitor (e.g. a capacitor 103a) and at least one inductor (e.g. an inductor 105a), among other things. The capacitor 103a and the inductor 105a may be electrically connected by a conducting material. The tank circuit 101a may store energy. For example, the capacitor 103a may store the energy as electric field (E) between plates of the capacitor 103a, depending on a voltage across the plates. The inductor 105a may store the energy as magnetic-field (B), depending upon a current passing through a coil of the inductor 105a.

In an exemplary case, when the inductor 105a is connected across the capacitor 103a (e.g. a charged capacitor), the voltage across the capacitor 103a may drive the current through the inductor 105a. Thereby, the magnetic-field (B) may be built around the coil of the inductor 105a. As a result, the voltage across the capacitor 103a may fall to zero as the charge is used for driving the current through the inductor 105a. At this point, the energy (i.e. the magnetic-field) stored in the coil of the inductor 105a induces a voltage across the coil, because the inductor 105a opposes the change in a flow of the current. The induced voltage may cause a current to recharge the capacitor 103a. Due to Faraday's law, an electro motive force (EMF) which drives the current is caused by a decrease in the energy (i.e. the magnetic-field) stored in the inductor 105a, thus energy required to charge the capacitor 103a is extracted from the energy (i.e. the magnetic-field) stored in the inductor 105a. When the energy in the inductor 105a is completely dissipated the flow of current may stop and the charge may again be stored in the capacitor 103a. Then the cycle will begin again, with the current flowing in an opposite direction through the inductor 105a from the capacitor 103a. In this way, the charge flows back and forth between the capacitor 103a and the inductor 105a. Thereby, the energy may oscillate back and forth between the capacitor 103a and the inductor 105a.

In an example embodiment, the oscillation of the energy may occur in the tank circuit 101a, when the tank circuit 101a is provided with an external current of a specific frequency at which an inductive reactance of the inductor 105a and a capacitive reactance of the capacitor 103a are equal in magnitude. Hereinafter, the specific frequency and resonance frequency may be interchangeably used to mean the same.

Some embodiments are based on the recognition that when the tank circuit 101a is applied with the external current with equivalent frequency as the resonance frequency of the tank circuit 101a, the oscillation of the energy may occur with large amplitude voltages and currents even if a quantity of the external current applied to the tank circuit 101a is small. Some embodiments are based on the realization that the principles of applying the external current of the resonance frequency to the tank circuit 101a can be extended to increase (or prolong) a life of a battery 103b. To this end, some embodiments formulate a modified tank circuit 101b by replacing: (i) the capacitor 103a with the battery 103b and (ii) the inductor 105a with a charge storage device 105b. Further, some embodiments aim to transform the principles of applying the external current of the resonance frequency to the tank circuit 101a, to principles of applying a specific voltage at a specific time defined by the resonance frequency, to the battery 103b. In an example embodiment, the charge storage device 105b may supply (or provide), to the battery 103b, the specific voltage at the specific time defined by the resonance frequency. For instance, the charge storage device 105b may include a bank of capacitors, a power supply, or a combination thereof. For instance, the battery 103b may be a rechargeable battery that can discharge the energy to an external load and charge again after being discharged by applying the current across its terminals. For example, the battery 103*b* may be a lead-acid battery which discharges (or charges) the energy due to a chemical reaction within the battery 103*b*, when a load (or a power supply) is connected across terminals of the battery 103*b*.

Some embodiments are based on the realization that the supply of the specific voltage at the specific time to the battery 103*b* enables an internal resonance within the battery 103*b* due to which the chemical reaction within the battery 103*b* may occur. As a result, an additional power may be extracted from the battery 103*b*. For example, the supply of the specific voltage at the specific time to the battery 103*b* enables to break free electrons within the battery 103*b*. These free electrons may lead to the additional power. Further, these free electrons may be used to charge the charge storage device 105*b*. Furthermore, the charge storage device 105*b* may recharge the battery 103*b* using the same free electrons with which the charge storage device 105*b* was charged. Thereby, a life of the battery 103*b* may be increased. For instance, a system for implementing the principles of applying, to the battery 103*b*, the specific voltage at the specific time is as explained in the detailed description of FIG. 2A.

FIG. 2A illustrates a block diagram of a system 201 for prolonging the life of a battery 207, according to some embodiments of the present disclosure. FIG. 2A is explained in conjunction with FIG. 1. The system 201 may include a controller 203, a charge storage device 205, and a battery 207. The charge storage device 205 may correspond to the charge storage device 105*b*. The charge storage device 205 may be a circuitry that includes, but is limited to, a plurality of capacitors and a plurality of relays. The plurality of capacitors may store the energy and/or discharge the energy as the electric field. The plurality of relays may enable a series configuration of the plurality of capacitors to be connected across terminals of the battery 207 and/or a parallel configuration of the plurality of capacitors to be connected across the terminals of the battery 207. Additionally or alternatively, the charge storage device 205 may include a power supply.

The battery 207 may be the rechargeable battery, for example, a lead-acid battery which may execute a discharge process (or a recharge process) due to the chemical reaction within the battery 207, when a load 209 (or a power supply) is connected across the terminals of the battery 207. For instance, the load 209 may be a DC motor, an electric vehicle, and/or the like. For instance, the discharge process of the battery 207 may be as explained in the detailed description of FIG. 2B.

FIG. 2B illustrates a block diagram 211 showing the discharge process of the battery 207, according to some embodiments of the present disclosure. The battery 207 may include two electrodes, for example, an anode made up of lead (Pb) and a cathode made up of lead peroxide (PbO$_2$). Further, the battery 207 may include an electrolyte which may be a dilute sulfuric acid (H$_2$SO$_4$). The electrodes may be placed within the electrolyte as shown in FIG. 2B. Further, the electrodes may be connected to the load 209 via a switch 213 using a conducting material. When the switch 213 is closed, the discharge process (i.e. electrons may flow from the anode to the cathode) of the battery 207 may begin due to chemical reaction within the battery 207. For example, the chemical reaction within the battery 207 during the discharge process is: Pb (Lead)+PbO$_2$ (Lead peroxide)+ 2H$_2$SO$_4$ (dilute sulfuric acid)→2PbSO$_4$ (Lead sulphate)+ 2H$_2$O (Water). As a result of the chemical reaction, the electrons may flow from the anode to cathode, while the Lead sulphate gets accumulated on the electrodes and the dilute sulfuric acid is further diluted. Alternatively, when the switch 213 is open, the discharge process of the battery 207 may stop.

Referring back to FIG. 2A, the battery 207 may be electrically connected to the charge storage device 205 to formulate a modified tank circuit (e.g. the modified tank circuit 101*b*), while the battery 207 is connected to the load 209. The charge storage device 205 may be further connected to the controller 203. The controller 203 may be a micro-controller based circuit. According to an embodiment, the controller 203 may be configured to receive a user input. For instance, the user input may include one or combination of a specification of the battery 207, a specification of the charge storage device 205, and/or a specification of the load 209. For example, the specification of the battery 207 may include information about the battery 207 such as impedance of the battery 207, an operating voltage of the battery, an inductance value associated with the battery 207 and/or the like. For example, the specification of the charge storage device 205 may include information about the charge storage device 205 such as impedance of the charge storage device 205, a capacitance value associated with the charge storage device 205 when the plurality of capacitors is in the series configuration, a capacitance value associated with the charge storage device 205 when the plurality of capacitors is in the parallel configuration and/or the like. For example, the specification of the load 209 may include information about the load 209 such as impedance of the load 209 and/or the like. In an alternate embodiment, the specification of the battery 207, the specification of charge storage device 205, and/or the specification of the load 209 may be predefined and stored within a memory associated with the controller 203.

According to an embodiment, the controller 203 may be configured to compute a resonance frequency value based on one or combination of the specification of the battery 207, the specification of charge storage device 205, and/or the specification of the load 209. For instance, the resonance frequency ($f_r$) may be mathematically computed using:

$$\frac{1}{2\pi\sqrt{L \times C}}$$

where the notation L is the inductance value associated with the battery 207, and the notation C is the capacitance value associated with the charge storage device 205. According to an embodiment, the resonance frequency may define a time at which the battery 207 should be provided with the specific voltage to achieve the internal resonance within the battery 207. Accordingly, the controller 203 may be configured to control the charge storage device 205 to supply the specific voltage to the battery 207, based on the computed resonance frequency. To this end, the charge storage device 205 may be configured to supply, to the battery 207, the specific voltage at the specific time defined by the resonance frequency. For example, when the battery 207 is supplied with the specific voltage, the battery 207 may reach an overvoltage condition due to which the chemical reaction may occur within the battery 207, leading to freeing up of electrons within the battery 207. As a result, an additional power may be extracted from the battery 207. Further, this extracted additional power may be used to charge the charge storage device 205. Further, the charge storage device 205 may recharge the battery 207, once the charge storage device 205 is charged. Thereby, the life of the battery 207 may be increased.

In an example embodiment, the plurality of capacitors of the charge storage device 205 may be pre-charged with the power supply. The plurality of capacitors of the charge storage device 205 may be used to supply the specific voltage to the battery 207. Specifically, the controller 203 may control the plurality of relays of the charge storage device 205 based on the computed resonance frequency such that the plurality of relays change the configuration associated with the plurality of capacitors to make the battery 207 reach the over voltage condition. In an example embodiment, the controller 203 may control the plurality of relays to change from the parallel configuration to the series configuration to make the battery 207 reach the over voltage condition, which may result in prolonging the life of the battery 207.

In an example embodiment, the controller 203 may control, based on the computed resonance frequency, the charge storage device 205 to supply the specific voltage to the battery 207 while the battery 207 is under the load 209. Accordingly, the additional power extracted from the battery 207 due to the supply of the specific voltage may not only be used to charge the charge device storage 205, but also may be used to power-up the load 209 when the load 209 demands for a more power than the operating voltage of the battery 207. Therefore, the system 201 may be used to prolong the life of the battery 207 and/or provide the load 209 with more power as per the requirements.

Here for the purpose of explanation, in FIG. 2A, the charge storage device 205 with the plurality of capacitors to supply the specific voltage and to store the additional power extract extracted from the battery 207 is considered. However, the plurality of capacitors may be replaced with other charging and discharging devices that are known in the art, without deviating from the scope of the present disclosure. Here for exemplary purpose, in FIG. 2A, the battery 207 located within the system 201 is considered. Alternatively, the battery 207 may be located outside the system 201, and may remain connected to the charge storage device 205 while connected to the load 209. Further, the components of the system 201 may not be limited to the components shown in FIG. 2A. For instance, the system 201 may also include some additional components that provide additional functionalities to the present disclosure. For instance, various configurations of the system 201 are as described in the detailed description of FIG. 3A-FIG. 5.

FIG. 3A illustrates a first configuration of a system 301 for prolonging the life of a battery 303, according to some embodiments of the present disclosure. FIG. 3A is explained in conjunction with FIG. 2A. The system 301 may include a battery 303, a charge storage device 305, and a controller 307. The battery 303 may correspond to the battery 207. For instance, the battery 303 may be a 12 volt 50 Ahr (Ampere hour) marine battery. The charge storage device 305 may correspond to the charge storage device 205. The charge storage device 305 may connected to the battery 303. The charge storage device 305 may include a plurality of capacitors 305a and 305b, a fuse 305c, and a plurality of relays 305d and 305e. The plurality of capacitors 305a and 305b, the fuse 305c, and the plurality of relays 305d and 305e may be arranged and connected as shown in FIG. 3A. The plurality of capacitors 305a and 305b may be used to move the battery to the overvoltage condition. The plurality of capacitors 305a and 305b may be configured to store the energy discharged from the battery 303 and recharge the battery 303 using the stored energy. For instance, the plurality of capacitors 305a and 305b may be two to five (2-5) Farad 12 volt capacitors. The fuse 305c may be configured to prevent the system 301 from an overcurrent condition. For instance, the fuse 305c may interrupt the flow of current within the system 301 when the current within the system 301 exceeds a threshold current value. The plurality of relays 305d and 305e are switching devices that enable the series configuration of the plurality of capacitors 305a and 305b to be connected to the terminals of the battery 303 and/or the parallel configuration of the plurality of capacitors 305a and 305b to be connected to the terminals of the battery 303. For instance, the plurality of relays 305d and 305e may be electromagnetic relays.

The controller 307 may correspond to the controller 203. The controller 307 may be the micro-controller based circuit. In an example embodiment, the controller 307 may include a timing circuit 307a. The controller 307 may be connected to the charge storage device 305. The controller 307 may be configured to compute the resonance frequency $(f_r)$. For instance, the resonance frequency $(f_r)$ may be mathematically computed using:

$$\frac{1}{2\pi\sqrt{L \times C}}.$$

For example, while considering the inductance of battery 303 to be 0.025 Henry and the capacitance of the plurality of capacitors 305a and 305b in the series configuration to be 2.5 Farad, the resonance frequency $(f_r)$ may be equal to 38.4 cycles per minute, which may be equal to 1.56 seconds per cycle.

Based on the resonance frequency, the controller 307 may be configured to control the charge storage device 305 to supply the specific voltage. In order to supply the specific voltage, the plurality of capacitors 305a and 305b may be designed and arranged in association with the plurality of relays 305d and 305e as shown in FIG. 3A. Accordingly, to supply the specific voltage to the battery 303, the controller 307 may be configured to control the plurality of relays 305d and 305e to change the configuration of the plurality of capacitors 305a and 305b with the battery 303. In an example embodiment, the timing circuit 307a may generate, based on the resonance frequency, control signal(s) to control the plurality of relays 305d and 305e to change the configuration of the plurality of capacitors 305a and 305b with the battery 303. For example, to supply the specific voltage to battery 303, the controller 307 may control the plurality of relays 305d and 305e to enable the series configuration of the plurality of capacitors 305a and 305b to be connected to the battery 303 due to which the battery 303 may move to the overvoltage condition. As a result, the chemical reaction in the battery 303 may occur. Thereby the additional power may be extracted from the battery 303. This additional power may be used to charge the plurality of capacitors 305a and 305b. For example, to charge the plurality of capacitors 305a and 305b from the battery 303, the controller 307 may control the plurality of relays 305d and 305e to enable the parallel configuration of the plurality of capacitors 305a and 305b to be connected to the battery 303. Once the plurality of capacitors 305a and 305b are charged, the plurality of capacitors 305a and 305b may recharge the battery 303. To recharge the battery 303 from the plurality of capacitors 305a and 305b, the controller 307 may control the plurality of relays 305d and 305e to enable the series configuration of the plurality of capacitors 305*a* and 305*b* to be connected to the battery 303. Thereby, the life associated with the battery 303 may be increased. With the first configuration of the system 301, a discharge time of the battery 303 may be increased by 60% for a given load specification. For instance, the discharge time may be a time taken by the battery 303 to completely discharge when connected to a load 309. In an example embodiment, the battery 303 may power-up the load 309 while the configuration of the plurality of capacitors 305*a* and 305*b* is in the series configuration and/or the configuration of the plurality of capacitors 305*a* and 305*b* is in the parallel configuration.

Additionally, the system 301 may include a voltage regulator 311 connected between the battery 303 and the load 309. The voltage regulator 311 may provide a constant voltage to the load 309 even if a condition associated with the battery is the overvoltage condition. Further, the system 301 may include a voltmeter 313 and a temperature sensor 315 connected to battery 303. The voltmeter 313 may provide voltage readings of the battery 303. The temperature sensor 315 may be configured to monitor a temperature associated with the battery 303. The temperature value associated with the battery may be used to prevent over-heating conditions. For instance, the system 101 may be provided with a cooling system coupled to the controller 307. When the temperature value of the battery 303 exceeds a threshold temperature value, the cooling system may be activated to prevent over-heating conditions.

Furthermore, the system 301 may include a temperature sensor 317 connected to the charge storage device 305. In an example embodiment, the temperature sensor 317 may be connected to the plurality of relays 305*d* and 305*e*. The temperature sensor 317 configured to monitor a temperature associated with the plurality of relays 305*d* and 305*e*. The temperature values associated with the plurality of relays 305*d* and 305*e* may be used to prevent over-heating conditions.

Here for exemplary purpose, in FIG. 3A, the relays 305*d* and 305*e* are considered to be the electromagnetic relays. However, the relays 305*d* and 305*e* may be replaced with solid state relays as shown in FIG. 3B.

FIG. 3B illustrates the first configuration of the system 301 with solid state relays, according to some other embodiments of the present disclosure. FIG. 3B is explained in conjunction with FIG. 3A. The system 301 may include the battery 303, the charge storage device 305, and the controller 307, among other things as shown in FIG. 3B. For sake of brevity, the operations (functions) associated with the battery 303 and the controller 307 may be omitted. However the operations (functions) associated with the battery 303 and the controller 307 are as explained in the detailed description of FIG. 3A.

The charge storage device 305 may correspond to the charge storage device 305 explained in the detailed description of FIG. 3A, but the plurality of relays 305*d* and 305*e* are replaced with a plurality of relays 305*f*, 305*g*, and 305*h*. The plurality of relays 305*f*, 305*g*, and 305*h* are solid state switching devices that enable the series configuration of the plurality of capacitors 305*a* and 305*b* to be connected to the terminals of the battery 303 and/or the parallel configuration of the plurality of capacitors 305*a* and 305*b* to be connected to the terminals of the battery 303. The plurality of relays 305*f*, 305*g*, and 305*h* may be controlled by the controller 307 based on the computed resonance frequency. For example, the timing circuit 307*a* embodied within the controller 307 may generate the control signal(s) to control the plurality of relays 305*f*, 305*g*, and 305*h*.

FIG. 4A illustrates a second configuration of a system 401 for prolonging the life of a battery 403, according to some embodiments of the present disclosure. FIG. 4A is explained in conjunction with FIG. 2A. The system 401 may include the battery 403, the charge storage device 405, and the controller 407. The battery 403 may correspond to the battery 207. For instance, the operating voltage of the battery 403 may be 12 volts. The charge storage device 405 may correspond to the charge storage device 205. The charge storage device 405 may connected to the battery 403. The charge storage device 405 may include a plurality of capacitors 405*a* and 405*b*, a fuse 405*c*, a power supply 405*d*, and a relay 405*e*. The plurality of capacitors 405*a* and 405*b*, the fuse 405*c*, the power supply 405*d*, and the relay 405*e* may be arranged and connected as shown in FIG. 4A. The plurality of capacitors 405*a* and 405*b* may be used to move the battery 403 to the overvoltage condition. For instance, the plurality of capacitors 405*a* and 405*b* may be two to five (2-5) Farad 12 volt capacitors. The fuse 405*c* may be configured to prevent the system 401 from the overcurrent condition. The power supply 405*d* may be 24 volts DC power supply. The power supply 405*d* may be used to pre-charge the capacitors 405*a* and 405*b*. The relay 405*e* is a switching device that enables the power supply 405*d* that is connected in parallel to the series configuration of the plurality of capacitors 405*a* and 405*b* to be connected to the terminals of the battery 403. For instance, the relay 405*e* may be an electromagnetic relay.

The controller 407 may correspond to the controller 203. The controller 407 may be connected to the charge storage device 405. The controller 407 may be configured to compute the resonance frequency ($f_r$). Based on the resonance frequency, the controller 407 may be configured to control the charge storage device 405 to supply the specific voltage to the battery 403. In an example embodiment, the controller 407 may include a timing circuit that generates the control signals to control the charge storage device 405. For example, to supply the specific voltage to battery 403, the controller 407 may control the relay 405*e* to enable the power supply 405*d* that is connected in parallel to the series configuration of the plurality of capacitors 405*a* and 405*b* to be connected to the terminals of the battery 403. As a result, the battery 403 may move to the overvoltage condition due to which the chemical reaction within the battery 403 may occur. Thereby the additional power may be extracted from the battery 403. This additional power may be used to charge the plurality of capacitors 405*a* and 405*b*. Once the plurality of capacitors 405*a* and 405*b* are charged, the plurality of capacitors 405*a* and 405*b* may recharge the battery 403. Thereby, the life of the battery 403 may be increased.

In an example embodiment, the controller 407 may control the relay 405*e* to move the battery 403 to the overvoltage condition, while the battery 403 is connected to a load 409. Additionally, when the load 409 demands for an AC (Alternating Current) power supply, the system 401 may include an inverter 411 connected between the battery 403 and the load 409. The inverter 411 may be configured to convert the DC current into the AC current. For example, the inverter 411 may be a grid tie inverter that converts the DC current into the AC current for delivering AC power supply to an electrical grid (i.e. the load 409). The grid tie inverter may also record a quantity of power extracted from the power supply 405*d* and a quantity of power supplied to the load 409. These recorded quantities may be used to compute a quantity of power extracted from the battery 403, which may be further used to compute an efficiency of the battery 403 or the like.

Here for exemplary purpose, in FIG. 4A, the relay 405e is considered to be the electromagnetic relay. However, the relay 405e may be replaced with a solid state relay as shown in FIG. 4B.

FIG. 4B illustrates the second configuration of the system 401 with a solid-state relay, according to some other embodiments of the present disclosure. FIG. 4B is explained in conjunction with FIG. 4A. The system 401 may include the battery 403, the charge storage device 405, and the controller 407, among other things as shown in FIG. 4B. For sake of brevity, the operations (functions) associated with the battery 403 and the controller 407 may be omitted. However the operations (functions) associated with the battery 403 and the controller 407 are as explained in the detailed description of FIG. 4A.

The charge storage device 405 may correspond to the charge storage device 405 explained in the detailed description of FIG. 4A, but the relay 405e may be replaced with a relay 405f. The relay 405f may be a solid state switching device that enables the power supply 405d connected in parallel to the series configuration of the plurality of capacitors 405a and 405b to be connected to the terminals of the battery 403. The relay 405f may be controlled by the controller 407.

For exemplary purpose, in FIG. 2A-FIG. 4B, the system comprising a single battery is considered. However, when the load demands for more power, the system may include a plurality of batteries to prevent the single battery from an over-discharge condition. For instance, a configuration of the system with multiple batteries is as explained in the detailed description of FIG. 5.

FIG. 5 illustrates a third configuration of a system 501 for prolonging the life of an active battery, according to some embodiments of the present disclosure. FIG. 5 is explained in conjunction with FIG. 2A. The system 501 may include a plurality of batteries 503a and 503b, the charge storage device 505, and the controller 507. Each of the plurality of batteries 503a and 503b may correspond to the battery 207. For instance, the batteries 503a and 503b may be a 12 volt 50 Ahr (Ampere hour) marine batteries. The charge storage device 505 may correspond to the charge storage device 205. The charge storage device 505 may connected to the batteries 503a and 503b. The charge storage device 505 may include a plurality of capacitors 505a and 505b, a power supply 505c, a plurality of first relays 505d and 505e, and a secondary relay 505f. The plurality of capacitors 505a and 505b, the power supply 505c, the plurality of first relays 505d and 505e, and the secondary relay 505f may be arranged and connected as shown in FIG. 5. The plurality of capacitors 505a and 505b may be used to move at least one of the batteries 503a and 503b to the overvoltage condition. For instance, the plurality of capacitors 505a and 505b may be two to five (2-5) Farad 12 volt capacitors. The power supply 505c may be a 24 volt DC power supply. The plurality of first relays 505d and 505e may be switching devices that enable one battery of the plurality of batteries 503a and 503b to power a load 509, while another battery of the plurality of batteries 503a and 503b being connected to the power supply 505c for charging. For instance, the plurality of first relays 505d and 505e may be electromagnetic relays. The secondary relay 505f may be a switching device that enables the power supply connected in parallel to the series configuration of the plurality of capacitors 505a and 505b to be connected to terminals of at least one of the plurality of batteries 503a and 503b. For instance, the secondary relay 505f may be the electromagnetic relay.

The controller 507 may correspond to the controller 203. The controller 507 may be connected to the charge storage device 505. The controller 507 may be configured to compute the resonance frequency $(f_r)$. Based on the resonance frequency, the controller 507 may be configured to control the charge storage device 505 to supply the specific voltage to at least one of the plurality of batteries 503a and 503b. In an example embodiment, the controller 507 may include a timing circuit that generates the control signals to control the charge storage device 505. For example, to supply the specific voltage to at least one of the plurality of batteries 503a and 503b, the controller 507 may control the secondary relay 505f to enable the power supply 505c that is connected in parallel to the series configuration of the plurality of capacitors 505a and 505b to be connected to the terminals of the at least one of the plurality of batteries 503a and 503b. Hereinafter, the at least one of the plurality of batteries 503a and 503b that is supplied with the specific voltage may be referred to as an active battery. Once the active battery is supplied with the specific voltage, the active battery may move to the overvoltage condition due to which the chemical reaction within the active battery may occur. Thereby the additional power may be extracted from the active battery. This additional power may be used to charge the plurality of capacitors 505a and 505b. Once the plurality of capacitors 505a and 505b are charged, the plurality of capacitors 505a and 505b may recharge the active battery. Thereby, the life of the active battery may be increased. In an example embodiment, the active battery from the plurality of batteries 503a and 503b may be determined by an Automatic Generator Start (AGS) 511. The AGS 511 may be connected to the charge storage device 505. The AGS 511 may be configured to control the plurality of first relays 505d and 505e to configure at least one of the plurality of batteries 503a and 503b as the active battery. Initially, the AGS 511 may randomly configure one battery of the plurality of batteries 503a and 503b as the active battery. Once a quantity of the voltage associated with the active battery is dropped below a voltage threshold value, the AGS 511 may configure another battery of the plurality of batteries 503a and 503b as the active battery by controlling the plurality of first relays 505d and 505e.

Additionally, when the load 509 demands for the AC (Alternating Current) power supply, the system 501 may include an inverter 513 connected between the charge storage device 505 and the load 509. The inverter 513 may be configured to convert the DC current into the AC current. For example, the inverter 513 may be a grid tie inverter that converts the DC current into the AC current for delivering AC power supply to an electrical grid (i.e. the load 509).

FIG. 6 illustrates a method 601 for prolonging the life of the battery, according to some embodiments of the present disclosure. The method 601 may be used in conjunction with the system 301 disclosed in the detailed description of FIG. 3A. Starting at step 603, the method 601 may include computing a resonance frequency, based on one or more combination of a specification of a battery, a specification of a charge storage device, and a specification of a load. For example, the controller 307 may compute the resonance frequency, based on one or more of the specification of the battery 303, the specification of the charge storage device 305, and the specification of the load 309.

At step 605, the method 601 may include controlling a plurality of relays associated with the charge storage device to change a configuration of a plurality of capacitors associated with the charge storage device to a first configuration. For example, the controller 307 may control the plurality of relays 305*d* and 305*e* to change the configuration of the plurality of capacitors 305*a* and 305*b* to the series configuration. When the configuration of the plurality of capacitors 305*a* and 305*b* is changed to the series configuration, the battery may reach the overvoltage condition due to which the chemical reaction occurs within the battery leading to freeing-up of the electrons. These free electrons may lead to the additional power.

At step 607, the method 601 may include checking if a first time within a time defined by the resonance frequency is completed. The first time may be an on-time period for which the battery should be in the overvoltage condition. If the first time is not completed, the method 601 may wait until the first time is completed. If the first time is completed, the method 601 may proceed to step 609.

At step 609, the method 601 may include controlling the plurality of relays associated with the charge storage device to change the configuration of the plurality of capacitors associated with the charge storage device to a second configuration. For example, the controller 307 may control the plurality of relays 305*d* and 305*e* to change the configuration of the plurality of capacitors 305*a* and 305*b* to the parallel configuration. When the configuration of the plurality of capacitors 305*a* and 305*b* is changed to the parallel configuration, the plurality of capacitors 305*a* and 305*b* may be charged with the additional power.

At step 611, the method 601 may include checking if a second time within the time defined by the resonance frequency is completed. The second time may be a time period obtained by subtracting the first time and the time defined by the resonance frequency. If the second time is not completed, the method 601 may wait until the second time is completed. If the second time is completed, the method 601 may proceed to step 605. At step 605, the configuration of the plurality of capacitors may be again changed to the series configuration to recharge the battery.

On implementing the method 601, the additional power may be extracted from the battery. The additional power may be used to charge the charge storage device. Once the charge storage device is charged, the charge storage device may recharge the battery. Thereby, the life of the battery may be increased in comparison to the convention life of the battery. In an example embodiment, the method 601 may be implemented by the system 301, when the battery is powering-up the load. For example, the load may be the electrical vehicle or electrical grid. Based on results from testing, to power-up the load to 96%, the system 301 uses 38% of power from the power supply that pre-charges the plurality of capacitors with little drainage on the battery.

Many modifications and other embodiments of the present disclosure set forth herein will come to mind to one skilled in the art to which the present disclosure pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

I claim:

1. A system for prolonging the life of a battery that is electrically coupled to a load comprising:
   a charge storage device electrically coupled to the battery forming a modified tank circuit, wherein the charge storage device includes a plurality of capacitors used to supply the specific voltage to the battery and a plurality of relays electrically coupled to the capacitors;
   a controller electrically coupled to the charge storage device, said controller configured to compute a resonance frequency defining a specific time at which the battery should be provided with a specific voltage to achieve an internal resonance within the battery; said controller further configured to direct the charge storage device to supply to the battery the specific voltage at the specific time defined by the resonance frequency.

2. The system for prolonging the life of a battery according to claim 1, wherein the controller is a micro-controller based circuit.

3. The system for prolonging the life of a battery according to claim 1, wherein the controller is configured to receive user input.

4. The system for prolonging the life of a battery according to claim 3, wherein the user input is selected from a group consisting of a specification of the battery, a specification of the charge storage device, and a specification of the load.

5. The system for prolonging the life of a battery according to claim 1, wherein a specification of the battery, a specification of the charge storage device, and a specification of the load are predefined and stored within a memory associated with the controller.

6. The system for prolonging the life of a battery according to claim 1, wherein the resonance frequency is mathematically computed using the formula:

$$\frac{1}{2\pi\sqrt{\begin{array}{c}\text{inductance value of battery} \times \\ \text{capacitance value of charge storage device}\end{array}}}.$$

7. The system for prolonging the life of a battery according to claim 1, wherein the controller is configured to switch the relays based on the computed resonance frequency to switch the capacitors between an over voltage configuration and a battery prolonging configuration.

8. The system for prolonging the life of a battery according to claim 7, wherein the controller includes a timing circuit that generates, based on the resonance frequency, a signal to control the plurality of relays.

9. The system for prolonging the life of a battery according to claim 7, wherein the relays are in series during the over voltage configuration and the relays are in parallel during the battery prolonging configuration.

10. The system for prolonging the life of a battery according to claim 1, wherein the charge storage device further comprises a power supply electrically coupled to the plurality of capacitors for pre-charging the capacitors.

11. The system for prolonging the life of a battery according to claim 10, further comprising an inverter electrically coupled between the battery and the load, said inverter configured to convert DC current into AC current for delivery to the load.

12. The system for prolonging the life of a battery according to claim 1, wherein a plurality of batteries are electrically coupled to the charge storage device.

13. A method for prolonging the life of a battery that is electrically coupled to a load comprising the steps of:

computing a resonance frequency defining a specific time at which a battery should be provided with a specific voltage to achieve an internal resonance within the battery;

controlling a plurality of relays associated with a charge storage device that is electrically coupled to the battery forming a modified tank circuit to change a configuration of a plurality of capacitors associated with the charge storage device to a first configuration;

checking if a first time within a time defined by the resonance frequency is completed;

upon completion of the first time, controlling the plurality of relays associated with the charge storage device to change the configuration of the plurality of capacitors associated with the charge storage device to a second configuration;

checking if a second time within the time defined by the resonance frequency is completed;

upon completion of the second time, returning to the step of controlling a plurality of relays and repeating the subsequent steps of the method.

14. The method for prolonging the life of a battery according to claim 13, wherein the step of computing a resonance frequency is based on one or more combination of a specification of the battery, a specification of the charge storage device, and a specification of the load.

15. The method for prolonging the life of a battery according to claim 13, wherein the first configuration is a series configuration causing the battery to reach an overvoltage condition, and the second configuration is a parallel configuration causing the plurality of capacitors to be charged with additional power.

16. The method for prolonging the life of a battery according to claim 13, wherein the first time is an on-time period for which the battery should be in an overvoltage condition.

17. The method for prolonging the life of a battery according to claim 16, wherein the second time is a time period obtained by subtracting the first time and the time defined by the resonance frequency.

\* \* \* \* \*